US010532956B2

(12) United States Patent
Culkin et al.

(10) Patent No.: US 10,532,956 B2
(45) Date of Patent: Jan. 14, 2020

(54) NATURAL STONE SEALER COMPOSITIONS

(71) Applicant: Questech Corporation, Rutland, VT (US)

(72) Inventors: Barry Culkin, Braintree, MA (US); Roger Questel, Arlington, VT (US); Robert Harrington, Plymouth, MA (US); Douglas Croteau, North Springfield, VT (US); Paul Thottathil, New Hyde Park, NY (US); Purushoth Kesavan, Franklin Square, NY (US); John Ryan, Bellmore, NY (US); Satyabrata Mukherjee, Westbury, NY (US)

(73) Assignee: Questech Corporation, Rutland, VT (US)

( * ) Notice: Subject to any disclaimer, the term of this patent is extended or adjusted under 35 U.S.C. 154(b) by 83 days.

(21) Appl. No.: 15/674,712

(22) Filed: Aug. 11, 2017

(65) Prior Publication Data

US 2019/0047916 A1 Feb. 14, 2019

(51) Int. Cl.
*C04B 41/48* (2006.01)
*B05D 5/08* (2006.01)
*C04B 111/00* (2006.01)
*C04B 111/20* (2006.01)
*C04B 111/54* (2006.01)

(52) U.S. Cl.
CPC ...... *C04B 41/4842* (2013.01); *C04B 41/4884* (2013.01); *C04B 41/4888* (2013.01); *C04B 2111/00482* (2013.01); *C04B 2111/2092* (2013.01); *C04B 2111/542* (2013.01)

(58) Field of Classification Search
CPC . C04B 41/4842; C04B 41/009; C04B 41/483; C04B 41/4884; C04B 41/4888; C04B 2111/00482; C04B 2111/2092; C04B 2111/542; B05D 5/083
USPC ....................................................... 427/384
See application file for complete search history.

(56) References Cited

U.S. PATENT DOCUMENTS

| 5,207,873 | A | 5/1993 | Sanduja et al. |
| 5,407,728 | A | 4/1995 | Kerr et al. |
| 6,085,797 | A | 7/2000 | Grabaum et al. |
| 6,638,319 | B2 | 10/2003 | Sanduja et al. |
| 6,783,865 | B2 | 8/2004 | Sanduja et al. |
| 6,908,976 | B2 | 6/2005 | Sanduja et al. |
| 6,943,218 | B1 | 9/2005 | Sanduja et al. |
| 6,994,794 | B2 | 2/2006 | Hansen et al. |
| 2004/0071912 | A1 | 4/2004 | Berth |
| 2014/0349106 | A1* | 11/2014 | Chen ..................... C04B 41/483 428/329 |
| 2017/0141719 | A1 | 5/2017 | Horgnies et al. |

FOREIGN PATENT DOCUMENTS

WO 2005049719 A2 6/2005

* cited by examiner

*Primary Examiner* — Ling Siu Choi
*Assistant Examiner* — Ronald Grinsted
(74) *Attorney, Agent, or Firm* — Pierce Atwood LLP; Kevin M. Farrell

(57) ABSTRACT

This invention relates to polymeric compositions for application onto natural stone in order to provide for long-term chemical, stain, and water resistance, along with antimicrobial properties. Many natural, unsealed stones do not have stain, etch, or water resistance. The described compositions were developed using a technology of chemical grafting that involves the use of prepolymers, monomers, catalysts, graft initiators, wetting agents, antimicrobial agents, and other ingredients. The composition, when thus applied to the stone surface allows it to obtain a graft polymerization, thereby forming a polymer film that is chemically attached to the natural stone, rather than typical physical bonding of other sealer compositions. The natural stones react with a graft initiator in the composition, which creates the reaction sites on the natural stone surface via free radical mechanisms. This in turn renders the natural stone to be receptive to attachment of monomers/prepolymers forming a polymeric film chemically bonded to the natural stone which then has the desired properties in terms of resistance to staining, etching, water penetration, etc., used in homes and light commercial applications, as well as for exterior use on building facades, monuments and the like.

15 Claims, No Drawings

NATURAL STONE SEALER COMPOSITIONS

BACKGROUND

Natural stone provides a decorative aspect to surfaces, such as walls within a household, building foyers and other public interior and exterior areas, including decorative monuments and building facades. Untreated natural stone in its raw, unsealed form may easily stain, etch, or otherwise visually deteriorate.

Various attempts have been made to inhibit such visible deterioration of natural stone. One technique involves using a sealer. Yet, most presently available sealers are penetrating sealers that leave the surface of the natural stone vulnerable to staining and etching quite readily after application.

SUMMARY

Offered are compositions that protect natural stone from staining, etching, and other visual degradation using a technology of chemically grafting a polymeric film to natural stone surfaces. The compositions may be applied to natural stone that is applied to the interior of structures (e.g., building floors, walls, etc.) as well as natural stone that is applied to exterior surfaces (e.g., monuments, facades, etc.).

One aspect of the present disclosure relates to a natural stone sealer composition. The composition includes a fluoropolymer, diethylene glycol monobutyl ether, an antimicrobial agent, water, a polycarbonate urethane acrylic hybrid prepolymer, a urethane acrylate monomer, a graft initiator metal halide ion, and a urea peroxide solution.

Another aspect of the present disclosure relates to a composition including a fluoropolymer, diethylene glycol monobutyl ether, polypropylene powder, an antimicrobial agent, water, an acrylic prepolymer, a polycarbonate urethane acrylic hybrid prepolymer, at least one urethane acrylate monomer, a fluoro dispersion, a fluoro surfactant, a urea peroxide solution, and a silver perchlorate solution.

A further aspect of the present disclosure relates to a method for sealing a natural stone with a composition. The method includes applying the composition to a surface of the natural stone. The composition includes at least a fluoropolymer, diethylene glycol monobutyl ether, an antimicrobial agent, water, a polycarbonate urethane acrylic hybrid prepolymer, a urethane acrylate monomer, a metal ion graft initiator, and a urea peroxide solution. The method further includes curing the composition on the natural stone.

DETAILED DESCRIPTION

Natural stone may be categorized as either calcareous or siliceous, depending on how it is formed. Calcareous stones include limestone, travertine, marble, onyx, and the like, and are made up primarily of calcium carbonate. Siliceous stones include granite, slate, and the like, and are made up primarily of silicon dioxides. In general, calcareous stone is more porous and more easily attacked by acids based on the calcium carbonate base, and is therefore more vulnerable to damage than siliceous stone. Nonetheless, it should be appreciated that the present compositions may be applied to both calcareous and siliceous stones to prevent staining, etching, and the like.

The presently disclosed compositions prevent natural stone from being stained and/or permanently acid etched by common household materials, such as red wine, ketchup, mustard, hot coffee, etc. The presently disclosed compositions also remain adhered to the surface of natural stone even when exposed to water for prolonged periods of time, due to the formation of chemical bonds. Moreover, the presently disclosed compositions allow the integrity of the natural look of the underlying natural stone to be maintained. The presently disclosed compositions additionally hold up to visual surface abrasion, and remain rather unslippery when both dry and wet. All of these properties make the presently disclosed compositions beneficial for use on natural stones applied to various surfaces of buildings (e.g., walls, floors, etc.) as well as various kinds of natural stone.

Compositions of the present disclosure may include a fluoropolymer, such as polyvinylfluoride (PVF), polyvinylidene fluoride (PVDF), polytetrafluoroethylene (PTFE), polychlorotrifluoroehtylene (PCTFE), perfluoroalkoxy polymer (PFA), fluorinated ethylene-propylene (FEP), polyethylenetetrafluoroethylene (ETFE), polyethylenechlorotrifluoroethylene (ECTFE), perfluoroelastomre, chlorotrifluoroethylenevinylidene fluoride, perfluoropolyether (PFPE), perfluorosulfonic acid (PFSA), and equivalents thereof. The fluoropolymer may be present in the composition from about 29.00 parts by weight to about 96.00 parts by weight. For example, the fluoropolymer may be present in the composition in about 29.00 parts by weight, about 40.00 parts by weight, about 90.00 parts by weight, or about 96.00 parts by weight.

Compositions of the present disclosure may be water based and may contain an organic cosolvent, such as ethylene glycol monobutyl ether, diethylene glycol monobutyl ether, triethylene glycol monobutyl ether, 2(2butoxy ethoxy)ethanol, and equivalents thereof. The organic co-solvent may be present in the composition from about 57.50 parts by weight to about 192.00 parts by weight. For example, the organic co-solvent may be present in the composition in about 57.50 parts by weight, 98.00 parts by weight, about 180.00 parts by weight, or 192.00 parts by weight.

Compositions of the present disclosure may also include polypropylene. For example, the polypropylene may be present in the composition in about 0.20 parts by weight.

Compositions of the present disclosure may further include an antimicrobial agent. The antimicrobial agent may be present in the composition from about 0.10 parts by weight to about 0.20 parts by weight.

Compositions of the present disclosure may also include a polar solvent, such as water and equivalents thereof. The polar solvent may be presented in the composition from about 157.50 parts by weight to about 672.00 parts by weight. For example, the polar solvent may be present in the composition in about 157.50 parts by weight, about 260.00 parts by weight, about 450.00 parts by weight, or about 672.00 parts by weight.

Compositions of the present disclosure may include an acrylic prepolymer, such as pure acrylic prepolymer, styrene acrylic prepolymer, vinyl acetate prepolymer, and equivalents thereof. The acrylic prepolymer may be present in the composition from about 60.00 parts by weight to about 224.00 parts by weight. The acrylic prepolymer may be present in the composition in about 60.00 parts by weight, about 65.00 parts by weight, or about 224.00 parts by weight.

Compositions of the present disclosure may additionally include a polycarbonate urethane/acrylic hybrid prepolymer. The polycarbonate urethane/acrylic hybrid prepolymer may be present in the composition from about 65.00 parts by weight to about 360.00 parts by weight. For example, the polycarbonate urethane/acrylic hybrid prepolymer may be present in the composition in about 65.00 parts by weight, about 75.00 parts by weight, about 224.00 parts by weight, or about 360.00 parts by weight.

Compositions of the present disclosure may include an acrylic prepolymer. The acrylic prepolymer may be self cross-linking. The acrylic prepolymer may be present in the composition from about 77.50 parts by weight to about 384.00 parts by weight. For example, the self cross-linking acrylic prepolymer may be present in the composition in about 77.50 parts by weight, about 130.00 parts by weight, about 240.00 parts by weight, or about 384.00 parts by weight.

Compositions of the present disclosure may also include a urethane acrylate monomer. The urethane acrylate monomer may be present in the composition from about 0.50 parts by weight to about 1.00 parts by weight.

Compositions of the present disclosure may also include one or more silane monomers. Each silane monomer may be present in the composition from about 0.10 parts by weight to about 2.00 parts by weight. For example, each silane monomer may be present in the composition in about 0.10 parts by weight, about 0.20 parts by weight, about 1.00 parts by weight, or about 2.00 parts by weight. In whole, silane monomers may be present in a composition from about 0.20 parts by weight to about 2.00 parts by weight. For example, a totality of silane monomers may be present in a composition in about 0.20 parts by weight, about 1.00 parts by weight, or about 2.00 parts by weight.

Compositions of the present disclosure may further include a fluoro dispersion. The fluoro dispersion may be present in a composition from about 8.00 parts by weight to about 90.00 parts by weight. For example, the fluoro dispersion may be present in the composition in about 8.00 parts by weight, about 30.00 parts by weight, or about 90.00 parts by weight.

Compositions of the present disclosure may include a fluoro surfactant solution. The fluoro surfactant solution may be a 2% solution. The fluoro surfactant solution may be present in the composition from about 4.00 parts by weight to about 8.00 parts by weight. For example, the fluoro surfactant solution may be present in a composition in about 4.00 parts by weight or about 8.00 parts by weight Compositions of the present disclosure may include a urea peroxide solution. The urea peroxide solution may be a 0.1% solution. The urea peroxide solution may be present in a composition from about 1.00 parts by weight to about 2.00 parts by weight. For example, the urea peroxide solution may be present in a composition in about 1.00 parts by weight or about 2.00 parts by weight.

Compositions of the present disclosure may include a silver perchlorate solution. The silver perchlorate solution may be a 0.01% solution. The silver perchlorate solution may be present in a composition from about 0.50 parts by weight to about 1.00 parts by weight. For example, the silver perchlorate solution may be present in a composition in about 0.50 parts by weight or about 1.00 parts by weight.

Compositions of the present disclosure may include tetrafluoroethylene-propylene copolymer. The tetrafluoroethylene-propylene copolymer may be present in the composition in about 300.00 parts by weight.

Compositions of the present disclosure may include a fluoro emulsion. The fluoro emulsion may be present in a composition in about 30.00 parts by weight.

Compositions of the present disclosure may include a phenoxy prepolymer dispersion. The phenoxy prepolymer dispersion may be present in a composition in about 0.20 parts per weight.

Compositions of the present disclosure may include a ferrous ammonium sulfate solution. The ferrous ammonium sulfate solution may be a 0.01% solution. The ferrous ammonium sulfate solution may be present in the composition in about 0.10 parts by weight.

Compositions of the present disclosure may include an aliphatic urethane prepolymer. The aliphatic urethane prepolymer may be present in a composition from about 65.00 parts by weight to about 160.00 parts by weight. For example, the aliphatic urethane prepolymer may be present in the composition in about 65.00 parts by weight or about 160.00 parts by weight.

General Composition Preparation

Compositions envisioned by the present disclosure may be prepared by mixing, in a container, acrylic prepolymers, urethane prepolymers, styrene acrylic prepolymers, epoxy prepolymers, coupling agents, wetting agents, thickeners, monomers, surfactants, water, co-solvents, catalysts, graft initiators, and antimicrobial agents, until a homogeneous mixture is achieved.

The homogeneous mixture may then be filtered using techniques to acquire a mixture having desired characteristics. Such filtration techniques may include gravity filtration, vacuum filtration, pressure filtration, and other presently and not yet known filtration techniques.

Application of Composition to Natural Stone

Compositions envisioned by the present disclosure may be applied to natural stone by spraying, flow coat, manual application with pads, rollers, etc., or any other convenient technique. The coated natural stone may then be air dried for about seventy-two (72) hours.

To accelerate the curing of the sealer (i.e., to cure/cross-link/provide protection to the natural stone more quickly), the coated natural stone may be subjected to curing at about 100° C. to about 110° C. for about ten (10) minutes to about fifteen (15) minutes after air drying for about ten (10) minutes to about fifteen (15) minutes, followed by air-drying for about 24 hours.

Example Composition 1

The following was mixed into a homogenous mixture:

| Components | Parts by Weight |
| --- | --- |
| Kynar 2821 powder | 29.00 |
| D.B. solvent | 57.50 |
| SSP 40 | 0.20 |
| UltraFresh DM | 0.10 |
| Water | 60.00 |
| Johncryl 538A | 60.00 |
| NeoPac R9036 | 75.00 |
| Water | 37.50 |
| Alberdingk AC 25381 | 77.50 |
| Water | 60.00 |
| SR 9035 | 0.50 |
| Coatosil 1770 | 1.00 |
| Fluoro AQ 50 | 8.00 |
| FC 4430 (2% solution) | 4.00 |
| Urea peroxide (0.1% solution) | 1.00 |
| Silver perchlorate (0.01% solution) | 0.50 |

The 29.00 parts by weight of Kynar 2821 powder was pre-mixed with the 57.50 parts by weight of D.B. solvent prior to being mixed with the remainder of the components;

the 60.00 parts by weight Johncryl 538A was pre-mixed with the 60.00 parts by weight of water prior to being mixed with the remainder of the components; the 75.00 parts by weight of NeoPac R9036 was premixed with the 37.50 parts by weight of water prior to being mixed with the remainder of the components; and the 77.50 parts by weight of Alberdingk AC 25381 was premixed with the 60.00 parts by weight of water prior to being mixed with the remainder of the components. The SSP40 was stirred in after filtering, at the end to maximize its dispersion.

Example Composition 2

The following was mixed into a homogenous mixture:

| Components | Parts by Weight |
|---|---|
| Kynar 2821 powder | 90.00 |
| D.B. solvent | 180.00 |
| UltraFresh DM | 0.20 |
| Water | 150.00 |
| Aflas 300S | 300.00 |
| NeoPac R9036 | 360.00 |
| Alberdingk AC 25381 | 240.00 |
| Water | 300.00 |
| Dynasilan F8815 | 0.10 |
| Fluoro AQ 50 | 90.00 |
| Coatosil 1770 | 0.10 |
| SR 9035 | 0.50 |
| API 296E | 30.00 |
| PKHW 34 | 0.20 |
| Urea peroxide (0.1% solution) | 1.00 |
| Ferrous ammonium sulfate (0.01% solution) | 0.10 |

The 90.00 parts by weight of Kynar 2821 powder was pre-mixed with the 180.00 parts by weight of D.B. solvent prior to being mixed with the remainder of the components and the 240.00 parts by weight of acrylic prepolymer Alberdingk AC25381 was premixed with the 300.00 parts by weight of water prior to being mixed with the remainder of the components.

Example Composition 3

The following was mixed into a homogenous mixture:

| Components | Parts by Weight |
|---|---|
| Kynar 2821 powder | 96.00 |
| D.B. solvent | 192.00 |
| UltraFresh DM | 0.20 |
| Water | 160.00 |
| Joncryl 538A | 224.00 |
| NeoPac R9036 | 224.00 |
| New Rez R9603 | 160.00 |
| Water | 192.00 |
| Alberdingk AC 25381 | 384.00 |
| Water | 320.00 |
| Coatosil 1770 | 2.00 |
| SR 9035 | 1.00 |
| Fluoro AQ 50 | 30.00 |
| FC 4430 (2.0% solution) | 8.00 |
| Urea peroxide (0.1% solution) | 2.00 |
| Silver perchlorate (0.01% solution) | 1.00 |

The 96.00 parts by weight of Kynar 2821 powder was premixed with the 192.00 parts by weight of D.B. solvent prior to being mixed with the remainder of the components. The 0.20 parts by weight of UltraFresh DM was premixed with the 160.00 parts by weight of water prior to being mixed with the remainder of the components. The 160.00 parts by weight of New Rez R9603 was premixed with the 192.00 parts by weight of water prior to being mixed with the remainder of the components. The 384.00 parts by weight of Alberdingk AC 25381 was premixed with the 320.00 parts by weight of water prior to be mixed with the remainder of the components.

Example Composition 4

The following was mixed into a homogenous mixture:

| Components | Parts by Weight |
|---|---|
| Kynar 2821 powder | 40.00 |
| D.B. solvent | 98.00 |
| Water | 65.00 |
| Joncryl 538A | 65.00 |
| FC 4430 (2% solution) | 4.00 |
| NeoPac R9036 | 65.00 |
| New Rez R9603 | 65.00 |
| Water | 65.00 |
| Alberdingk AC 25381 | 130.00 |
| Water | 130.00 |
| Dynasilan F8815 | 0.20 |
| SR 9035 | 1.00 |
| Urea peroxide (0.1% solution) | 1.00 |
| Silver perchlorate (0.01% solution) | 1.00 |
| Ultrafresh DM | 0.20 |

The 40.00 parts by weight of Kynar 2821 powder was premixed with the 98.00 parts by weight of D.B. solvent prior to being mixed with the remainder of the components. The 65.00 parts by weight of water was premixed with the 65.00 parts by weight of Joncryl 538A prior to being mixed with the remainder of the components. The 65.00 parts by weight of the new Rez R9603 was premixed with the 65.00 parts by weight of water prior to being mixed with the remainder of the components. The 130.00 parts by weight of the Alberdingk AC 25381 was premixed with the 130.00 parts by weight of water prior to being mixed with the remainder of the components.

Testing Performed to Confirm the Properties of the Compositions as Applied to Natural Stone Wet Dynamic Coefficient of Friction (DCOF) Test ANSI A137.1-2012 Section 9.6.1 testing was performed to measure the DCOF (i.e., slip-resistance) of ceramic tiles under the wet condition using a BOT 3000 device. Three (3) tiles without any composition according to the present disclosure being applied thereto, three (3) tiles having Composition 1 applied thereto, three (3) tiles having Composition 2 applied thereto, and three (3) tiles having Composition 3 applied thereto were tested. A minimum wet DCOF value of 0.42 is preferred for such testing.

The raw tiles and the tiles having the compositions applied thereto were cleaned with Renovator #120. Thereafter, the tiles were tested in all four directions with 6 inch long measurements. Testing was performed under wet conditions using 0.05% SLS water. Testing was conducted under laboratory conditions at approximately 70° F. and 50% relative humidity using a calibrated BOT 3000E device.

The following represents the individual and average DCOF data for each tile tested.

Tiles Without Compositions Applied

| Direction | Tile 1 | Tile 2 | Tile 3 |
|---|---|---|---|
| Direction 1 | 0.49 | 0.51 | 0.49 |
| Direction 2 | 0.49 | 0.52 | 0.48 |
| Direction 3 | 0.48 | 0.48 | 0.48 |
| Direction 4 | 0.47 | 0.51 | 0.48 |
| Average | 0.48 | 0.51 | 0.48 |

Tiles With Composition 1 Applied

| Direction | Tile 1 | Tile 2 | Tile 3 |
|---|---|---|---|
| Direction 1 | 0.44 | 0.41 | 0.41 |
| Direction 2 | 0.44 | 0.39 | 0.39 |
| Direction 3 | 0.43 | 0.41 | 0.39 |
| Direction 4 | 0.41 | 0.42 | 0.39 |
| Average | 0.43 | 0.41 | 0.40 |

Tiles With Composition 2 Applied

| Direction | Tile 1 | Tile 2 | Tile 3 |
|---|---|---|---|
| Direction 1 | 0.38 | 0.35 | 0.40 |
| Direction 2 | 0.37 | 0.36 | 0.39 |
| Direction 3 | 0.36 | 0.37 | 0.37 |
| Direction 4 | 0.38 | 0.34 | 0.37 |
| Average | 0.37 | 0.36 | 0.38 |

Tiles With Composition 3 Applied

| Direction | Tile 1 | Tile 2 | Tile 3 |
|---|---|---|---|
| Direction 1 | 0.51 | 0.48 | 0.48 |
| Direction 2 | 0.51 | 0.48 | 0.48 |
| Direction 3 | 0.49 | 0.48 | 0.47 |
| Direction 4 | 0.50 | 0.48 | 0.48 |
| Average | 0.50 | 0.48 | 0.48 |

Visible Abrasion Resistance of Glazed Ceramic Tile Test

ASTM C1027-09 testing was performed to measure the resistance of tile surfaces to visible surface abrasion. One 4 inch by 4 inch tile was tested for each composition.

A Gabbrielli Abrasimeter W1 was used to abrade the tiles. 10% hydrochloric acid was used to remove any metal oxide staining. The following represents the findings of the tests.

| Composition Applied to the Tile | Results |
|---|---|
| Composition 1 | Visual difference in gloss or color after 750 revolutions = Class 3-suitable for heavy residential or light commercial use |
| Composition 2 | Visual different in gloss or color after 12,000 revolutions = Class 5-suitable for heavy commercial use |
| Composition 3 | Visual difference in gloss or color after 1,500 revolutions = Class 3-suitable for heavy residential or light commercial use |

Stain Test

CTIOA T-72 testing was performed to determine the stain and etch resistance effectiveness of the herein disclosed compositions when used on porous tile or stone samples. Three (3) samples were tested per staining agent per composition.

The samples were left in contact with the staining agents for 4 hours and then cleaned, dried, and evaluated for staining. The following represents the findings of the tests.

| Staining Agent | Untreated Natural Stone | Composition 1 | Composition 2 | Composition 3 |
|---|---|---|---|---|
| Hot coffee (black) | Medium stain | No stain | Light stain | No stain |
| Red wine | Medium stain, light etching | No stain | Light stain | No stain |
| Mustard | Light stain, light etching | No stain | No stain | No stain |
| Ketchup | Light stain, light etching | No stain | No stain | No stain |
| Wesson Oil | Heavy statin | No stain | No stain | No stain |
| Soy Oil | Heavy stain | No stain | No stain | No stain |
| Formula 409 | No visible effect | No stain | No stain | No stain |

While the present invention has been particularly described in conjunction with specific embodiments, it is evident that many alternatives, modifications, and variations will be apparent to those skilled in the art in light of the foregoing description. It is therefore contemplated that the appended claims will embrace any such alternatives, modifications, and variations as falling within the true scope and spirit of the present invention.

What is claimed is:

1. A composition comprising:
   a fluoropolymer;
   diethylene glycol monobutyl ether;
   polypropylene powder;
   an antimicrobial agent;
   water;
   an acrylic prepolymer;
   a polycarbonate urethane acrylic hybrid prepolymer;
   a self cross-linking acrylic prepolymer;
   at least one urethane acrylate monomer;
   an aqueous fluoropolymer;
   a surfactant solution comprising a polymeric fluorochemical;
   a urea peroxide solution; and
   a silver perchlorate solution.

2. The composition of claim 1, wherein the fluoropolymer is about 6.15% by weight based on the total weight of the composition.

3. The composition of claim 1, wherein the diethylene glycol monobutyl ether is about 12.19% by weight based on the total weight of the composition.

4. The composition of claim 1, wherein the polypropylene powder is about 0.04% by weight based on the total weight of the composition.

5. The composition of claim 1, wherein the antimicrobial agent is about 0.02% by weight based on the total weight of the composition.

6. The composition of claim 1, wherein the water is about 33.38% by weight based on the total weight of the composition.

7. The composition of claim 1, wherein the acrylic prepolymer is about 12.72% by weight based on the total weight of the composition.

8. The composition of claim 1, wherein the polycarbonate urethane acrylic hybrid prepolymer is about 15.90% by weight based on the total weight of the composition.

9. The composition of claim 1, wherein the self cross-linking acrylic prepolymer is about 16.43% by weight based on the total weight of the composition.

10. The composition of claim 1, wherein the at least one urethane acrylate monomer is about 0.32% by weight based on the total weight of the composition.

11. The composition of claim 1, wherein the aqueous fluoropolymer is about 1.70% by weight based on the total weight of the composition.

12. The composition of claim 1, wherein the surfactant solution comprising a polymeric fluorochemical is about 0.85% by weight based on the total weight of the composition.

13. The composition of claim 1, wherein the urea peroxide solution is about 0.21% by weight based on the total weight of the composition.

14. The composition of claim 1, wherein the silver perchlorate solution is about 0.11% by weight based on the total weight of the composition.

15. The composition of claim 1, wherein the aqueous fluoropolymer comprises polytetrafluoroethylene (PTFE).

* * * * *